United States Patent
Iranpour et al.

(10) Patent No.: US 10,746,896 B2
(45) Date of Patent: Aug. 18, 2020

(54) POSITIONING SURVEY SENSORS USING AN AIRBORNE VEHICLE

(71) Applicant: WESTERNGECO LLC, Houston, TX (US)

(72) Inventors: Kambiz Iranpour, Asker (NO); Guillaume Jean Daniel Tamboise, Katy, TX (US); Einar Holst, Asker (NO)

(73) Assignee: WesternGeco L.L.C., Houston, TX (US)

( * ) Notice: Subject to any disclaimer, the term of this patent is extended or adjusted under 35 U.S.C. 154(b) by 468 days.

(21) Appl. No.: 15/101,463

(22) PCT Filed: Dec. 5, 2014

(86) PCT No.: PCT/US2014/068760
§ 371 (c)(1),
(2) Date: Jun. 3, 2016

(87) PCT Pub. No.: WO2015/085155
PCT Pub. Date: Jun. 11, 2015

(65) Prior Publication Data
US 2016/0306071 A1    Oct. 20, 2016

Related U.S. Application Data

(60) Provisional application No. 61/912,787, filed on Dec. 6, 2013.

(51) Int. Cl.
*G01V 8/02* (2006.01)
*G01S 17/08* (2006.01)
(Continued)

(52) U.S. Cl.
CPC ............... *G01V 8/02* (2013.01); *G01S 17/08* (2013.01); *G01S 17/42* (2013.01); *G01S 17/86* (2020.01); *G01S 17/88* (2013.01)

(58) Field of Classification Search
CPC .......... G01V 1/003; G01V 1/22; G01S 17/08; G01S 17/42; G01S 17/88; G01S 17/023; G01S 17/06
See application file for complete search history.

(56) References Cited

U.S. PATENT DOCUMENTS 5,109,362 A * 4/1992 Berni ................. G01H 9/00
356/487
5,557,397 A * 9/1996 Hyde .................... G01C 11/02
356/2

(Continued)

FOREIGN PATENT DOCUMENTS

CN    102381481 A    3/2012
EP    1901153 A1    3/2008
(Continued)

OTHER PUBLICATIONS

LIDARCOMM, LIDAR Seismic Applications, weblink http://lidarcomm.com/id33.html (2 pages).
(Continued)

*Primary Examiner* — Eric L Bolda
(74) *Attorney, Agent, or Firm* — Fletcher Yoder, P.C.

(57) ABSTRACT

An airborne vehicle includes a positioning system to acquire information relating to a position of the airborne vehicle, and a measurement system to transmit signals to and receive signals from survey sensors of a survey arrangement used to survey a target structure, the received signals indicating positions of the respective survey sensors.

19 Claims, 4 Drawing Sheets

(51) Int. Cl.
*G01S 17/88* (2006.01)
*G01S 17/86* (2020.01)
*G01S 17/42* (2006.01)

(56) References Cited

U.S. PATENT DOCUMENTS

| | | | | |
|---|---|---|---|---|
| H001618 H | * | 12/1996 | Blume | 367/125 |
| 7,184,072 B1 | * | 2/2007 | Loewen | G01C 11/02 348/140 |
| 7,298,869 B1 | * | 11/2007 | Abernathy | G06K 9/0063 324/323 |
| 7,835,221 B2 | * | 11/2010 | Vigen | G01V 1/3835 367/19 |
| 8,564,296 B2 | | 10/2013 | Zhdanov et al. | |
| 9,400,338 B2 | * | 7/2016 | Coste | G01V 1/223 |
| 2002/0060784 A1 | * | 5/2002 | Pack | G01S 7/481 356/6 |
| 2002/0154287 A1 | * | 10/2002 | Bowers | G01S 17/36 356/5.1 |
| 2006/0036367 A1 | * | 2/2006 | Brewster | G01V 11/00 702/14 |
| 2009/0168602 A1 | * | 7/2009 | Wilcox | G01V 1/223 367/76 |
| 2009/0234585 A1 | * | 9/2009 | Ross | G01V 1/22 702/14 |
| 2014/0078865 A1 | * | 3/2014 | Coste | G01V 1/223 367/77 |

FOREIGN PATENT DOCUMENTS

| | | |
|---|---|---|
| KR | 1020100111263 A | 10/2010 |
| WO | 2013071185 A1 | 5/2013 |

OTHER PUBLICATIONS

International Search Report and Written Opinion issued in the related international application PCT/US2014/068760 dated Mar. 23, 2015 (16 pages).

International Preliminary Report on Patentabiltiy issued in the related international application PCT/US2014/068760 dated Jun. 6, 2016 (12 pages).

Examination report issued in the related GC Application GC201428478, dated Feb. 26, 2018 (5 pages).

Examination report issued in the related GC Application GC201428478, dated Oct. 4, 2018 (3 pages).

Examination report issued in the related GC Application GC201428478, dated Mar. 8, 2019 (3 pages).

* cited by examiner

POSITIONING SURVEY SENSORS USING AN AIRBORNE VEHICLE

CROSS-REFERENCE TO RELATED APPLICATION

This application claims the benefit under 35 U.S.C. § 119(e) of U.S. Provisional Application No. 61/912,787, filed Dec. 6, 2013, which is hereby incorporated by reference.

BACKGROUND

A survey operation can be used for identifying subsurface elements, such as hydrocarbon reservoirs, fresh water aquifers, gas injection zones, and so forth. Survey operations can include seismic survey operations, in which seismic sources (such as seismic vibrators or other types of sources) are placed at various locations. The seismic sources are activated to generate seismic waves directed into a subsurface structure.

The seismic waves generated by a seismic source travel into the subsurface structure. A portion of the seismic waves are reflected back to the surface for detection by seismic sensors, such as hydrophones, geophones, accelerometers, and so forth. The seismic sensors produce signals that represent detected seismic waves. Signals from the seismic sensors are processed to yield information about the content and characteristics of the subsurface structure.

Other survey operations can employ electromagnetic (EM) sources and sensors. An EM source can produce an EM wave that is emitted into the subsurface structure. EM signals affected by the subsurface structure are detected by EM sensors. Signals from the EM sensors are processed to yield information about the content and characteristics of the subsurface structure.

SUMMARY

In general, according to some implementations, an airborne vehicle includes a positioning system to acquire information relating to a position of the airborne vehicle, and a measurement system to transmit signals to and receive signals from survey sensors of a survey arrangement used to survey a target structure, the received signals indicating positions of the respective survey sensors.

Other or additional features will become apparent from the following description, from the drawings, and from the claims.

BRIEF DESCRIPTION OF THE DRAWINGS

Some implementations are described with respect to the following figures.

DETAILED DESCRIPTION

Although reference is made to performing surveying to characterize a subsurface earth structure, techniques or mechanisms according to some implementations can also be applied to perform surveys of other target structures, such as human tissue, a mechanical structure, plant tissue, animal tissue, a solid volume, a substantially solid volume, a liquid volume, a gas volume, a plasma volume, a volume of space near and/or outside the atmosphere of a planet, asteroid, comet, moon, or other body, and so forth. In addition, the following describes seismic sources and seismic sensors that are part of seismic survey equipment. In other implementations, other types of survey equipment can be used, which can include EM sources and EM sensors or other types of survey sources and survey sensors.

In a land-based survey arrangement, survey sensors can be arranged on a ground surface. The survey sensors can be arranged in an array (one-dimensional array or two-dimensional array). In other examples, the survey sensors can have other geometrical arrangements.

When processing survey data collected by the survey sensors, positions of the survey sensors are used. In some examples, the positions of survey sensors can be determined using positioning information acquired by Global Positioning System (GPS) receivers associated with the survey sensors.

The GPS receiver of each survey sensor can provide synchronization information, as well as position information. However, the position information can be inaccurate.

In other examples, more accurate positioning equipment can be provided at the survey sensors to acquire the positioning information of the survey sensors. However, the more accurate positioning equipment can be costly and labor-intensive.

In accordance with some implementations, positioning of survey sensors can be based on use of an unmanned airborne vehicle, which is referred to as a "drone" in the ensuing discussion. An unmanned airborne vehicle or drone can refer to any vehicle that can fly or otherwise be provided in the air over land. The drone does not have any human in the drone that controls the flight of the drone. Rather, the drone can be controlled remotely, or in some examples, the drone can autonomously control its flight path, based on input information supplied to the drone. In yet further examples, the drone can semi-autonomously control its flight path, with human input provided to adjust the flight path as desired.

Figure 1:
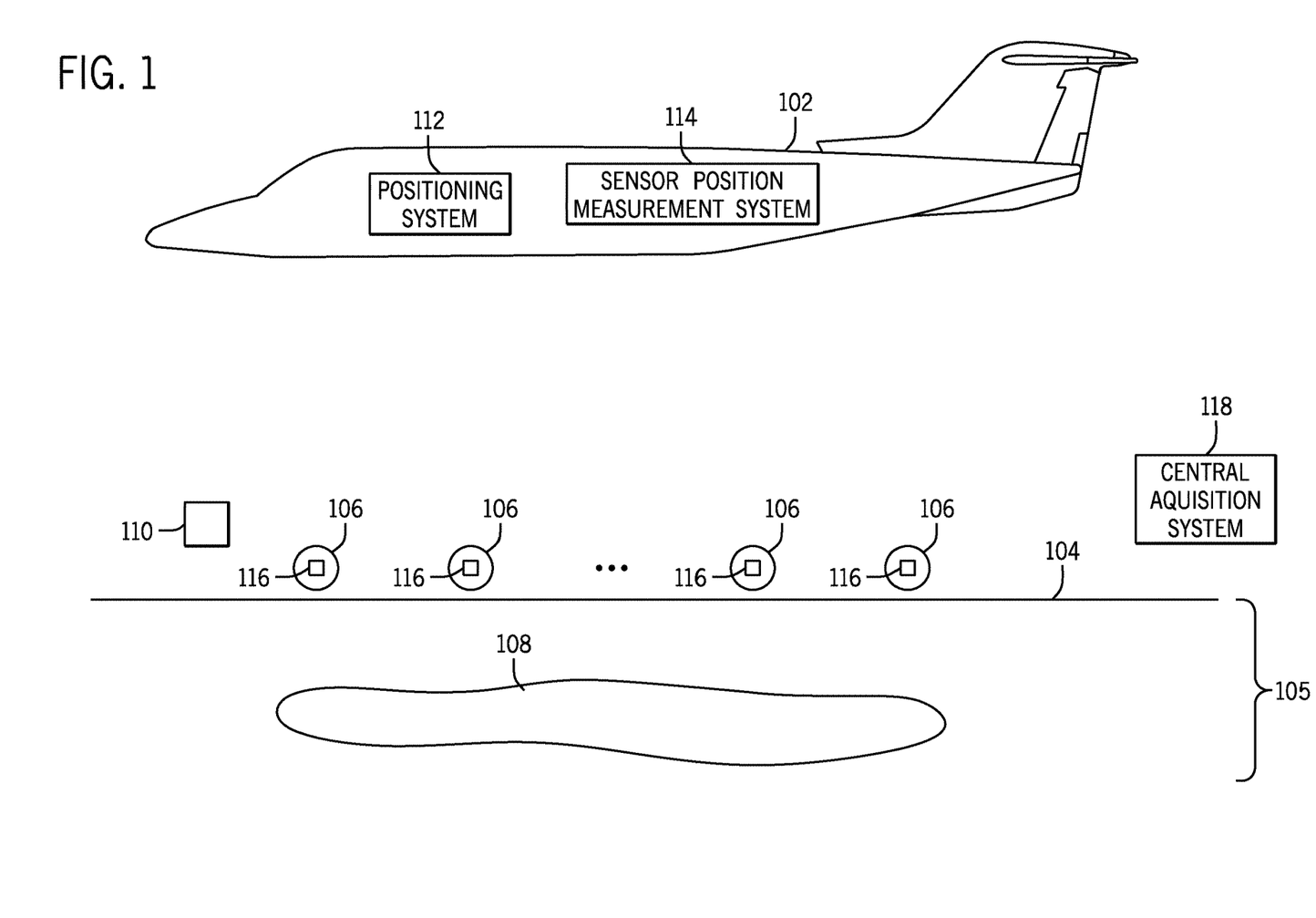
FIG. 1 is a schematic diagram of an example arrangement that includes an unmanned airborne vehicle according to some implementations used in identifying positions of survey sensors of a survey arrangement.

FIG. 1 is a schematic diagram of an example arrangement that includes a drone 102 that is flying in the air over a land surface 104. Although just one drone 102 is depicted in FIG. 1, note that in other examples multiple drones can be provided, configured in similar fashion as the drone 102 of FIG. 1.

In some examples, the drone 102 can be a vehicle that derives its vertical lift and lateral propulsion from a propeller-based propulsion system. The drone 102 can include multiple propellers that are driven by corresponding engines (electric motors, for example) of the drone 102 for purposes of controlling the vertical lift and/or lateral movement of the drone 102. In other examples, the drone 102 achieves its vertical lift using buoyancy provided by lighter than air gas that is stored inside a body of the drone 102. In this regard, the drone 102 can include a bladder or balloon that is filled with helium, for example. In further examples, the drone 102 can be a multicopter or multi-rotor vehicle or a fixed wing-based vehicle that has a propulsion system that is powered by an electric or gasoline motor.

Survey sensors 106 of a survey acquisition system (or more generally a survey arrangement) are provided on the land surface 104. The survey sensors 106 can be considered to be nodes of a nodal survey acquisition system.

The survey sensors 106 are provided on the land surface 104 above a subsurface structure 105, which includes one or more subsurface elements 108 of interest. As examples, the one or more subsurface elements 108 of interest can include a hydrocarbon reservoir, a fresh water aquifer, a gas injection zone, and so forth.

The survey acquisition system further includes at least one survey source 110, which is able to emit survey signals that are propagated into the subsurface structure 105. Signals affected by the subsurface structure 105 are detected by the survey sensors 106. The measured signals of the survey sensors 106 can be communicated to a processing system (not shown in FIG. 1), which is able to process the survey data acquired by the survey sensors 106 to characterize the content and characteristics of the subsurface structure 105. In some examples, the processing system can generate an image of the subsurface structure 105, a model of the subsurface structure 105, or some other representation of the subsurface structure 105.

In some examples, the survey sensors 106 include seismic survey sensors, such as geophones, accelerometers, and so forth, and the survey source 110 can include a seismic source, such as a seismic vibrator, an airgun, and so forth, that is able to generate seismic waves propagated into the subsurface structure 105.

In other examples, the survey sensors 106 can include EM sensors, and the survey source 110 can include an EM source that is able to emit EM waves into the subsurface structure 105.

The drone 102 includes a positioning system 112 that is able to acquire information relating to a position of the drone 102. In addition, the drone 102 includes a sensor position measurement system 114 that is able to determine positions of the survey sensors 106.

In some examples, the positioning system 112 can include a satellite-based augmentation system (SBAS), which complements a Global Navigation Satellite System (GNSS) to improve accuracy in satellite-based positioning. With SBAS, reference stations arranged across a wide geographical area, such as an entire continent, can be used to make GNSS measurements (measurements of GNSS satellites). The GNSS measurements acquired by the reference stations can be used to calculate any errors associated with GNSS positioning information. The error information can be sent to GNSS satellites for broadcast to end stations, such as the positioning system 112 in the drone 102 of FIG. 1. An SBAS-based positioning system 112 can provide more accurate positioning than positioning based on just GPS receiver measurements.

In other examples, other types of positioning systems can be employed for determining a position of the drone 102. For example, the positioning system 112 can additionally or alternatively include an inertial measurement unit (IMU), which includes components to measure the drone's velocity, orientation, and gravitational forces. For example, the components can include accelerometers, gyroscopes, compasses, magnetometers, and so forth.

The sensor position measurement system 114 is able to measure signals from the survey sensors 106. The measured signals are indicative of positions of the survey sensors 106.

In some examples, the sensor position measurement system 114 can include a light source to emit light towards the survey sensors 106. Light can be reflected from the survey sensors 106 and detected by one or multiple optical receivers in the sensor position measurement system 114. In some examples, the light source can include a laser source to emit laser towards the survey sensors 106. The light is reflected by the survey sensors 106 and detected by one or more optical receivers of the sensor position measurement system 114.

In some examples, the sensor position measurement system 114 can also include an infrared camera to capture infrared images of the survey sensors 106. The infrared camera on the drone is sensitive to infrared light that is emitted from a survey sensor that is warmer than the environment. As a result, the survey sensors 106 will be visible in infrared images taken by the infrared camera on the drone 102. The infrared images can be applied through an image processing algorithm to determine positions of the survey sensors.

In other examples, acoustic emitters can be used to emit acoustic beams, and acoustic receivers can receive reflected acoustic beams to aid in positioning of the survey sensors.

In more specific examples, the sensor position measurement system 114 can include an LIDAR (light detection and ranging) system, which measures distance by illuminating a target with a laser and analyzing the reflected light.

In other examples, instead of detecting reflected light form the survey sensors 106, the survey sensors 106 themselves can include light sources that are used to emit light that can be detected by one or more optical receivers of the sensor position measurement system 114.

In other examples, other types of signals can be measured by the sensor position measurement system 114 for determining positions of the survey sensors 106. Such other signals can include acoustic signals, for example.

In some examples, each survey sensor 106 can include or otherwise be associated with a GPS receiver 116 that is able to acquire rough positioning data of the survey sensors 106. The GPS positioning data may not indicate accurate positions of the survey sensors 106, but such positioning data can be communicated to a central acquisition system 118 over a communication link (e.g. wireless link, electrical link, optical link, etc.) to a central acquisition system 118. The central acquisition system 118 can include a computer system or multiple computer systems.

The central acquisition system 118 can upload the GPS positioning data to the drone 102 to provide the drone 102 with a rough indication of the general area where the survey sensors 106 are located. The drone 102 can then fly to the general area to perform the determination of the specific positions of the survey sensors 106.

In other examples, the GPS receivers 116 can be omitted, with an operator supplying to the drone 102 the information regarding the position of the general area of the survey sensors 106.

Figure 2:
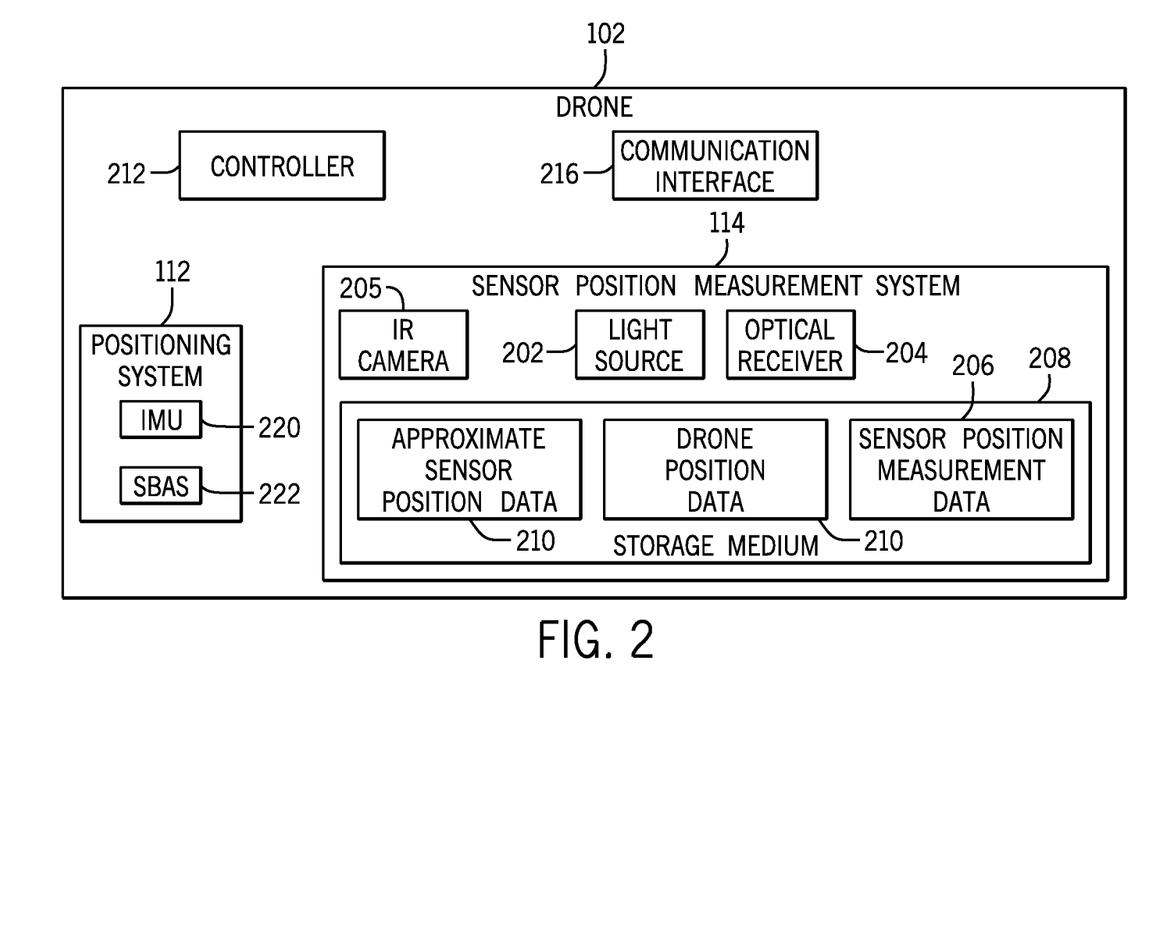
FIG. 2 is a block diagram of example components of the unmanned airborne vehicle, according to some implementations.

FIG. 2 is a block diagram of various components of the drone 102 according to some implementations. As shown in FIG. 2, the sensor position measurement system 114 includes a light source 202 for emitting light (e.g. laser light) or an electromagnetic beam towards the survey sensors 106 in FIG. 1. Backscattered light from the survey sensors 106 in response to the emitted light from the light source 202 can be detected by an optical receiver 204. In addition, the sensor position measurement system 114 in some examples can include an infrared camera 205 as noted above, and/or an acoustic measurement subsystem including an acoustic emitter and acoustic receiver (not shown). Although just one light source 202 and optical receiver 204 are depicted in FIG. 2, it is noted that in other examples, more than one light source and/or optical receiver can be provided.

The optical receiver 204 can include a LIDAR sensor, a camera (e.g. infrared camera or other type of camera), or any other type of sensor that is capable of detecting optical signals.

Sensor position measurement data 206 detected by the optical receiver 204 can be stored in a storage medium 208. The sensor position measurement data 206 can include measurement data relating to the positions of the survey sensors 106.

The storage medium 208 can also store drone position data 210 as acquired by the positioning system 112.

The drone 102 also includes a controller 212, which can be used to control the flight path of the drone 102. In some examples, the controller 212 is able to autonomously fly according to a predetermined flight path using GNSS-based navigation waypoints. In other examples, the controller 212 can be responsive to remote control input from a human operator for controlling the flight path of the drone 102.

In some examples, approximate sensor position data 214 of the survey sensors 106 can be stored in the storage medium 208 to provide a rough estimate of the general area where the survey sensors 106 are located (as discussed above). The approximate sensor position data 214 can be based on data acquired by GPS receiver(s) 116 in one or more of the survey sensors 106.

In other examples, the approximate sensor position data 214 can be programmed into the storage medium 208 by a human operator, based on knowledge of the human operator regarding the general positions of the survey sensors 106.

In other examples, the approximate sensor position data 214 can be omitted, with the drone 102 being directed to the general location of the survey sensors 106 by a remote entity, such as a human, a machine, or program code.

In examples where the approximate sensor position data 214 is stored in the storage medium 208, and the controller 212 is able to autonomously control the flight path of the drone 102, the controller of 212 can retrieve the approximate sensor position data 214 and, using the positioning system 112, direct the drone 102 towards the general location of the survey sensors 106.

The positioning system 112 can include an IMU 220, which includes components to measure the drone's velocity, orientation, and gravitational forces. For example, the components can include accelerometers, gyroscopes, compasses, magnetometers, and so forth. As noted above, the positioning system 112 can also include an SBAS 222 to determine an accurate position of the drone 102.

Once the drone 102 has flown to the general location of the survey sensors 106, the controller 212 can control the sensor position measurement system 114 to acquire position data regarding the survey sensors 106.

Upon completing its tasks, the drone 102 can return to a designated location, where the sensor position measurement data 206 and the drone position data 210 can be downloaded for processing. In other examples, the drone 102 can include a communication interface 216 that is able to communicate with a remote processing system (e.g. a computer system or multiple computer systems). In such examples, the communication interface 216 can communicate the sensor position measurement data 206 and the drone position data 210 through the communication interface 216 to the remote processing system. The communication can include wireless communications, for example.

The processing system can use the sensor position measurement data 206 and the drone position data 210 to determine a specific position of each survey sensor 106. The drone position data 210 identifies the location of the drone 102, and the sensor position measurement data 206 identifies the relative position of the survey sensor 106 to the drone 102.

Figure 3:
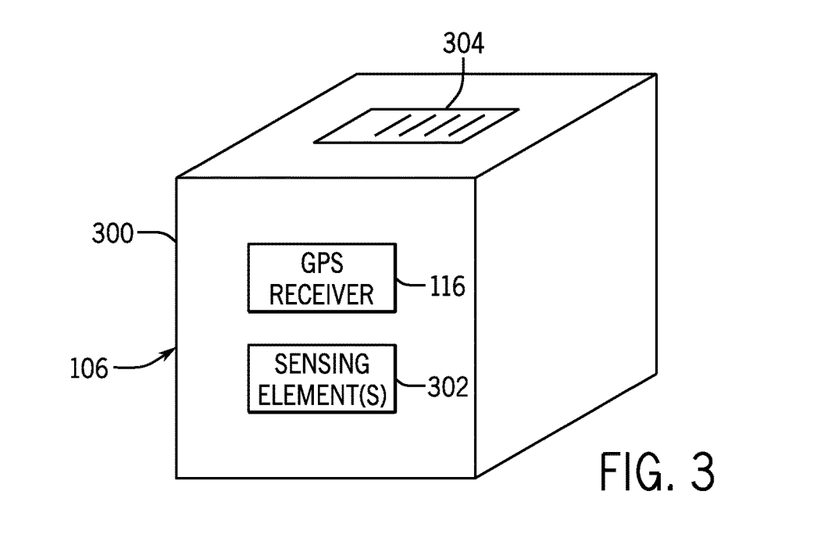
FIG. 3 is a schematic diagram of a survey sensor according to some implementations.

FIG. 3 is a schematic diagram of a survey sensor 106 according to some examples. The survey sensor 106 includes a housing 300 in which are contained one or more sensing element 302 and the GPS receiver 116. If the survey sensor 106 is a seismic sensor, the sensing element(s) 302 can include one or any combination of the following: geophone, accelerometer, hydrophone, etc. If the survey sensor 106 is an EM sensor, the sensing element(s) 302 can include electrodes to measure EM signals.

A reflector 304 can be arranged on an exterior wall of the housing 300 of the survey sensor 106. Light emitted by the drone 102 can be reflected from the reflector 304 back towards the drone 102 for detection by the optical receiver 204 of the drone 102. The reflector 304 can be formed of a reflective material that is selected according the type of search signal that is being transmitted by the drone. Also, the reflector 304 can have a specified shape or pattern etched or painted on the reflector 304 so that an image captured by the optical receiver or camera 204 can be recognized as that of the reflector 304.

Figure 4:
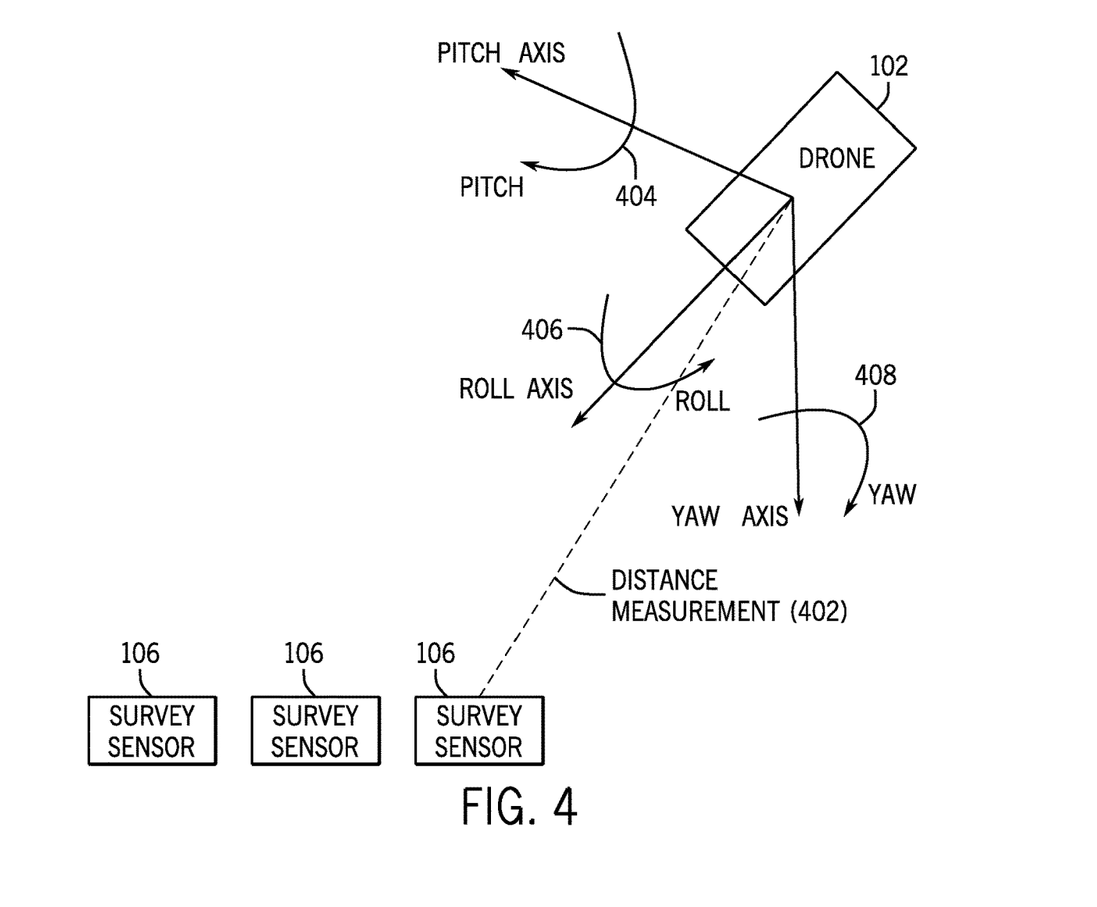
FIG. 4 is a schematic diagram of orientations of an unmanned airborne vehicle useable to determine positions of survey sensors according to some implementations.

The position of a survey sensor 106 can be based on both a distance measurement between the drone 102 and the survey sensor 106, as well as based on an orientation of the drone 102. As shown in FIG. 4, a distance measurement 402 can be made between the drone 102 and a survey sensor 106. The distance measurement 402 is based on measurement by the optical receiver 204 (FIG. 2) of the drone 102 in response to emitted light from the light source 202. As a specific example, the distance measurement 402 can be a LIDAR distance measurement.

The orientation of the drone 102 can also be determined, where the orientation of the drone 102 can be indicate angles of the drone 102 relative to respective axes. For example, the orientation of the drone 102 can be based on a pitch 404 (relative to a pitch axis), a roll 406 (relative to a roll axis), and a yaw 408 (relative to a yaw axis) of the drone 102. The pitch 404, roll 406, and yaw 408 of the drone 102 can be determined using orientation sensors (e.g. magnetometers, gyroscopes, compasses, etc.), such as those of the IMU 220 shown in FIG. 2. In other examples, orientation sensors separate from the IMU 220 can be used to determine the orientation of the drone 102.

The orientation of the drone 102 in conjunction with the distance between the drone 102 and a survey sensor 106 can be used to determine a specific position of the survey sensor 106. To determine the position of a point in space, the distance and sighting angles are used. In a polar coordinate system these angles are defined as $\theta$ and $\varphi$, and $r$ is the distance to the object. In other examples, the distance to a survey sensor can be measured by the drone 102 from several positions to solve for the position of the survey sensor. One example is measuring the distance by LIDAR and the sighting angles by a compass. Another example uses an image from a camera fastened to the drone 102 and having fixed points with known position in the area. Image processing and pattern recognition techniques can be used to project the imaged area and the fixed points, with known positions, to determine the position and orientation of a survey sensor. In addition to the position of the camera fastened to the drone, knowing its orientation in space can help determine the position and orientation of the objects that have been imaged. Also in this case capturing images from several known points in space by a camera can determine the position of the survey sensor and its orientation.

Figure 5:
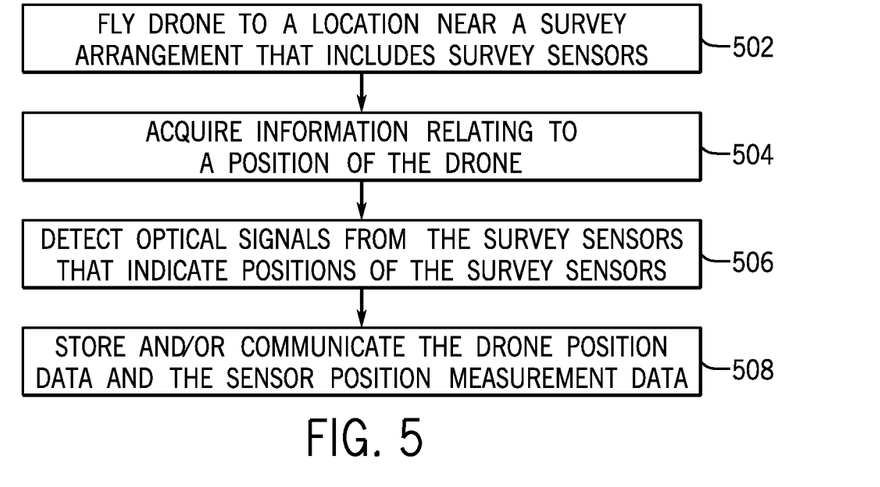
FIG. 5 is a flow diagram of a positioning process according to some implementations.

FIG. 5 is a flow diagram of a positioning process according to some implementations. The process of FIG. 5 flies (at 502) the drone 102 to a location near a survey arrangement that includes survey sensors.

The positioning system 112 of the drone 102 acquires (at 504) information relating to a position of the drone 102. In addition, the sensor position measurement system 114 detects (at 506) optical signals from the survey sensors 106, where the detected optical signals indicate positions of the respective survey sensors 106. The optical signal from a survey sensor can be the reflection of the transmitted signal from the drone 102.

Position data of the drone 102 acquired by the positioning system 112 and the sensor position measurement data acquired by the sensor position measurement system 114 can be stored and/or communicated (at 508) by the drone 102.

In further examples, an image of a group of survey sensors can be captured. An image processing algorithm can be applied on the image of the group of survey sensors to find a center of the group of survey sensors.

Figure 6:
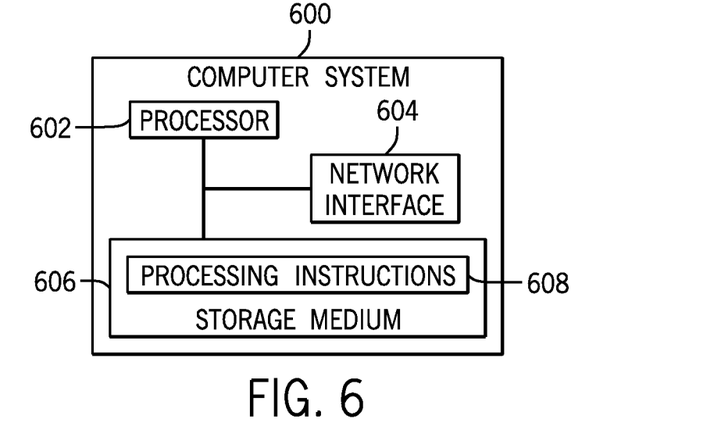
FIG. 6 is a block diagram of an example computer system, in accordance with some implementations.

FIG. 6 is a block diagram of an example computer system 600 according to some implementations, which can be used to implement the processing system discussed above and/or the central acquisition system 118 of FIG. 1. The computer system 600 can include a computer or an arrangement of multiple computers. The computer system 600 includes a processor (or multiple processors) 602, which can be coupled to a network interface 604 to allow the computer system 600 to communicate over a network, such as with the drone 102 and/or the survey sensors 106. A processor can include a microprocessor, a microcontroller, a physical processor module or subsystem, a programmable integrated circuit, a programmable gate array, or another physical control or computing device.

The computer system 600 further includes a non-transitory machine-readable or computer-readable storage medium (or storage media) 606, which can store data, such as data received from the drone 102 and/or survey sensors 106. Also, the storage medium (or storage media) 606 can store machine-readable or machine-executable instructions, such as processing instructions 608 to process the measurement data from the drone 102 to determine positions of the survey sensors 106. The positions of the survey sensors 106 can be used as part of survey data processing, either by the computer system 600 or by another computer system, to characterize content and characteristics of a subsurface structure (e.g. 105 in FIG. 1).

The storage medium (or storage media) 606 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An airborne vehicle comprising:
   a positioning system to acquire information relating to a position of the airborne vehicle, wherein the positioning system comprises a satellite-based augmentation system (SBAS);
   a light source to emit light;
   a measurement system to receive signals of survey sensors of a survey arrangement used to survey a target structure, wherein the measurement system receives the signals from one or more of the survey sensors, wherein the received signals indicate positions of the respective survey sensors, wherein the received signals include optical signals and wherein the optical signals are reflected from one or more reflectors on the survey sensors; and
   one or more of an infrared camera and an acoustic measurement subsystem for use in determining the positions of the respective survey sensors.

2. The airborne vehicle of claim 1, wherein the airborne vehicle is unmanned.

3. The airborne vehicle of claim 1, wherein the light source comprises a laser source to emit a laser.

4. The airborne vehicle of claim 1, further comprising an orientation sensor to make a measurement indicative of angles of the airborne vehicle with respect to at least one of the survey sensors.

5. The airborne vehicle of claim 4, wherein the orientation sensor is to measure pitch, roll, and yaw of the airborne vehicle.

6. The airborne vehicle of claim 1, wherein the airborne vehicle receives approximate positions of the respective survey sensors from a central acquisition system, and uses the approximate positions as guidance to an area including the respective survey sensors.

7. A method comprising:
   flying an airborne vehicle comprising a positioning system to acquire information relating to a position of the airborne vehicle and a light source to emit light, wherein the positioning system comprises a satellite-based augmentation system (SBAS);
   acquiring, by the positioning system on the airborne vehicle, information relating to the position of the airborne vehicle;
   receiving, by a measurement system on the airborne vehicle, signals from survey sensors of a survey arrangement used to survey a target structure, wherein the measurement system receives the signals from one or more of the survey sensors, wherein the received signals indicate positions of the respective survey sensors, wherein the received signals include optical signals and wherein the optical signals are reflected from one or more reflectors on the survey sensors; and determining the positions of the respective survey sensors using one or more of an infrared camera and an acoustic measurement subsystem.

8. The method of claim 7, further comprising capturing an infrared image of the survey sensors, and using the captured infrared image to determine the positions of the respective survey sensors.

9. The method of claim 7, further comprising communicating the information relating to the position of the airborne vehicle and measurement data corresponding to the received signals to a remote processing system for use in processing survey data acquired by the survey sensors.

10. The method of claim 9, further comprising:
measuring, using at least one orientation sensor in the airborne vehicle, an orientation of the airborne vehicle; and
communicating the orientation of the airborne vehicle to the remote processing system.

11. The method of claim 7, further comprising:
receiving, by the positioning system from a central acquisition system, approximate location data of an area including the survey arrangement, where the approximate location data is derived from positioning data obtained by at least one global positioning system (GPS) receiver in the survey arrangement; and
using, by the positioning system, the approximate location data to guide the airborne vehicle to the area including the survey arrangement.

12. The method of claim 7, wherein the optical signals are reflected from the one of more reflectors in response to light emitted from the light source in the airborne vehicle.

13. The method of claim 12, wherein the light source includes a laser source, and wherein the measurement system is to use laser detection and ranging to determine distances between the airborne vehicle and the survey sensors.

14. The method of claim 12, wherein the optical signals are received by a camera on the airborne vehicle.

15. The method of claim 7, further comprising:
capturing an image of a group of survey sensors; and
processing the image of the group of survey sensors to find a center of the group of survey sensors.

16. An article comprising at least one non-transitory machine-readable storage medium storing instructions that upon execution cause a system to:
receive information relating to a position an unmanned airborne vehicle, wherein the received information relating to the position of the unmanned airborne vehicle comprises information from a satellite-based augmentation system (SBAS) of the unmanned airborne vehicle;
emit light from a light source associated with the unmanned airborne vehicle;
receive measurement data acquired by a measurement system on the airborne vehicle, wherein the measurement data is related to an output produced by a source on the airborne vehicle and to positions of survey sensors of a survey arrangement used to survey a target structure, wherein the measurement system receives signals from one or more of the survey sensors, wherein the received signals indicate positions of the respective survey sensors, wherein the received signals include optical signals and wherein the optical signals are reflected from one or more reflectors on the survey sensors; and
determine the positions of the survey sensors based on the measurement data and the information relating to the position of the airborne vehicle using one or more of an infrared camera and an acoustic measurement subsystem.

17. The article of claim 16, wherein the instructions upon execution cause the system to further receive a measured orientation of the unmanned airborne vehicle, wherein determining the positions of the survey sensors is further based on the measured orientation.

18. The article of claim 16, wherein the instructions upon execution cause the system to further receive approximate positions of the respective survey sensors from a central acquisition system, and use the approximate positions to guide the unmanned airborne vehicle to an area including the respective survey sensors.

19. The article of claim 18, wherein the central acquisition system receives positioning data of one or more survey sensors from a receiver associated with the one or more survey sensors.

* * * * *